US011821386B2

(12) United States Patent
Larsson

(10) Patent No.: US 11,821,386 B2
(45) Date of Patent: Nov. 21, 2023

(54) FLARE SYSTEM

(71) Applicant: SWEDISH STIRLING AB, Västra Frölunda (SE)

(72) Inventor: Gunnar Larsson, Gothenburg (SE)

(*) Notice: Subject to any disclaimer, the term of this patent is extended or adjusted under 35 U.S.C. 154(b) by 0 days.

(21) Appl. No.: 17/783,806

(22) PCT Filed: Dec. 9, 2020

(86) PCT No.: PCT/EP2020/085215
§ 371 (c)(1),
(2) Date: Jun. 9, 2022

(87) PCT Pub. No.: WO2021/116151
PCT Pub. Date: Jun. 17, 2021

(65) Prior Publication Data
US 2023/0036799 A1 Feb. 2, 2023

(30) Foreign Application Priority Data

Dec. 10, 2019 (EP) .................... 19214662

(51) Int. Cl.
*F02G 1/053* (2006.01)
*F23G 5/46* (2006.01)
*F23G 7/08* (2006.01)

(52) U.S. Cl.
CPC .............. *F02G 1/053* (2013.01); *F23G 5/46* (2013.01); *F23G 7/085* (2013.01); *F23G 2206/203* (2013.01)

(58) Field of Classification Search
CPC ...... F02G 1/053; F02G 2254/10; F02G 1/055; F23G 5/46; F23G 7/085; F23G 2206/203; Y02E 20/12

(Continued)

(56) References Cited

U.S. PATENT DOCUMENTS 9,337,704 B1 * 5/2016 Leslie ................. B01D 21/262
9,617,168 B2 * 4/2017 Duesel, Jr. ............. C02F 1/048
(Continued)

FOREIGN PATENT DOCUMENTS

EP      3535568 A1    9/2019
JP   2009156233 A    7/2009
WO  2008055829 A1    5/2008

OTHER PUBLICATIONS

International Search Report and Written Opinion for International Application No. PCT/EP2020/085215, entitled "Flare System," consisting of 9 pages, dated Feb. 3, 2021.

(Continued)

*Primary Examiner* — Hoang M Nguyen
(74) *Attorney, Agent, or Firm* — Hamilton, Brook, Smith & Reynolds, P.C.

(57) ABSTRACT

A flare system including a flare stack and a modular flare unit connected in parallel with the flare stack. The modular flare unit includes a frame, at least two energy conversion modules detachably supported by the frame, a fuel manifold, an air manifold, an exhaust manifold, and an electric generator. Each energy conversion module includes a combustion chamber configured to receive a flow of residue gas through the fuel inlet for combustion in the chamber at (or close to) atmospheric pressure, and a Stirling engine configured to convert heat from the combustion chamber into mechanical energy. The electric generator is connected to generate electric power from the mechanical energy.

16 Claims, 7 Drawing Sheets

(58) Field of Classification Search
USPC .................................................. 60/517–526
See application file for complete search history.

(56) References Cited

U.S. PATENT DOCUMENTS

| | | |
|---|---|---|
| 2006/0213196 A1 | 9/2006 | Sukioka |
| 2019/0101079 A1 | 4/2019 | Nunn |
| 2022/0065194 A1 | 3/2022 | Larsson |

OTHER PUBLICATIONS

Caillat, S., "Burners in the steel industry: utilization of by-product combustion gases in reheating furnaces and annealing lines," Energy Procedia 120, pp. 20-27 (2017).

\* cited by examiner

FLARE SYSTEM

This application is the U.S. National Stage of International Application No. PCT/EP2020/085215, filed Dec. 9, 2020, which designates the U.S., published in English, and claims priority under 35 U.S.C. § 119 or 365(c) to European Application No. 19214662.9, filed Dec. 10, 2019. The entire teachings of the above applications are incorporated herein by reference.

FIELD OF THE INVENTION

The present invention relates to a flare system capable of recovering energy in residue gases generated in an industrial process, such as a smelting plant.

BACKGROUND OF THE INVENTION

In many industries, various processes result in residue gas, often including a mix of burnable gases. One specific example is the reduction process in smelting plants, where carbon reacts with oxygen in metal oxide, in order to obtain pure metal with CO as a rest product. Further, due to the enormous heat, water present in the metal ore is split into hydrogen ($H_2$) and oxygen. The mixing ratio of CO and $H_2$ will depend on the amount of moisture in the ore.

Conventionally, such residue gases are used to some extent in various heating applications in the smelting plant. However, typically a large portion (e.g. 40% or more) of the residue gas cannot be recovered and is then typically burned in a flare stack in order to get rid of the toxic CO.

A flare stack is a cheap and robust way to combust residual gas with varying content, and to eliminate any explosive or poisonous gases included therein. A flare stack typically includes a relatively tall vertical pipe, to ensure that the flare is located at an elevated position to avoid high concentrated poisonous gases and heat radiation on ground also providing a small facility footprint. The combustion in a flare is performed at low (atmospheric) pressure, and is sufficiently safe to operate in areas of high safety regulations. The flare also has a highly dynamic burn rate, which may be easily controlled from zero to a large burn rate.

Despite its advantages, a flare does have a few significant drawbacks. To begin with, it has no useful energy conversion, i.e. all energy content in the residue gas is consumed and evaporated into the surroundings. Further, the open flare causes noise and a potentially disturbing light. Finally, the flare may cause particle pollution in its near vicinity, as sufficient particle filtering is typically not provided before flaring or possible to implement at flare tip. Also CO2 capture is hard to implement at flare tip.

Much effort has been made in the past to recover the energy in the residue gases, primarily by re-using the gas in the industry process to a larger extent.

Further, in large plants, where there is a large and steady supply of residue gas, it may be possible to use this gas to power a turbine in order to generate electrical power. The turbine is a complex technical system which requires massive expensive infrastructure with a large footprint, maintenance personnel. In order to be profitable, it needs continuous supply of residue gas exceeding 5-10 MW of output turbine power to be profitable. FIG. 1 shows schematically an industrial site 1 where a turbine power station 4 is connected to a smelting plant 1. The permanent crew of personnel is housed in a building 5. Construction and installation of the turbine power station and building 5 would not be possible inside the perimeter of the site 1 without interrupting the smelting process for a considerable time, and the turbine station 4 and building 5 are therefore placed outside the site perimeter. The residue gas is led to the turbine in a long pipe 6. The whole turbine infrastructure requires detailed planning and advanced construction. It also requires highly trained personnel for both operation and maintenance.

Often, however, the flow of gas and its energy content varies significantly over time. There are two reasons for this:
In many processes, the mass flow of gas varies as a consequence of the reduction process in the furnace
The composition of the gas, e.g. the content of combustible gases such as CO and $H_2$, varies over time, thereby affecting the available chemical energy per mass unit of gas.

Additionally, these factors also imply that the available energy per time unit may be the same for very different volumes of gas. This is another challenge for turbine systems.

Further, even when a turbine station is successfully installed, there is still typically a final portion of residue gas which is quickly varying, and cannot be absorbed by the turbine. Again, this portion will typically be burned in a flare stack.

Attempts have been made to recover also smaller and quickly varying flows of residue gas, e.g. in a combustion engine. This solution requires smaller footprint and is profitable from a few hundred kW and more. However, this is difficult, as there is a significant variation of $H_2$ content in the residue gas. Therefore, the ignition cannot be controlled when the $H_2$ is mixed with oxygen and compressed. Also, the gas may contain contaminations, including particles that may melt and stick to the cylinder and valves. Such contaminations will require costly maintenance, and in worst case permanent damage of the engine.

Another challenge is the importance of reliable operation of the industrial process. Even a brief interruption of an industrial process such as a smelting plant leads to loss of significant monetary values. This is even more problematic considering the high risk characteristics of the industry. Any construction of buildings or installations on site will typically require shutting down the industry process, making such activities more or less impossible, or at least extremely difficult. Therefore, any system connected to the stream of residue gas must not only be very reliable in operation, but also be easy to install and service in an environment with high standards of safety regarding facility and personnel.

As mentioned, each plant producing residue gas has a unique characteristic of the gas flow in terms of content, median flow, minimum flow, maximum flow, flow variance over the production cycle. An energy conversion system with optimum profit must therefore be designed according to the local prerequisites which increase the cost and complexity of planning and construction. The increased cost and complexity lead to a negative return on investment, especially for smaller average residue gas power flows, e.g. 10 MW output power or less.

There is thus a need for an improved flare process which allows recovery of energy in residue gases from industrial processes.

General Disclosure of the Invention

It is an object of the present invention to address the problems mentioned above, and provide an improved flare system capable of recovering energy in residue gases from industrial processes, which system is capable of handling varying gas content and especially hydrogen, is adaptable to local gas flow characteristic, allows a high degree of flexibility, and may be installed at an arbitrary industrial plant without extensive construction and/or on-site maintenance.

According to a first aspect to the present invention, this and other objects are achieved by a flare system for recovery of energy in a flow of residual gas generated in an industrial process, the system including a flare stack connected to the flow of residue gas and arranged to perform open combustion of the residue gas, and at least one modular flare unit connected to the flow of residue gas in parallel with the flare stack, the modular flare unit being arranged to recover energy in the residue gas. Each modular flare unit includes a frame, at least two energy conversion modules detachably supported by the frame, a fuel manifold connected to receive the flow of residue gas, an air manifold connected to receive air from the ambient, an exhaust manifold connected to receive exhaust from the energy conversion modules, and an electric generator. Each energy conversion module includes a combustion chamber having a fuel inlet selectively connectable to the fuel manifold via a fuel valve, an air inlet selectively connectable to the air manifold via an air valve, and an exhaust outlet connected to the exhaust manifold, the combustion chamber configured to receive a flow of residue gas through the fuel inlet for combustion in the chamber at near atmospheric pressure, and a Stirling engine configured to convert heat from the combustion chamber into mechanical energy, the Stirling engine having a heat engine heat exchanger including a set of tubes conducting a compressible working fluid, a portion of the heat engine heat exchanger extending into the combustion chamber, and one or several cylinders each having a piston connected to an output shaft. The electric generator is connected to the output shaft and is configured to generate electric power from the mechanical energy.

The invention is based on the realization that combustion at, or close to, atmospheric pressure, avoids most drawbacks with an internal combustion engine, which conventionally have been used to recover energy from residue gas. A machine capable of converting heat energy from low pressure combustion is the Stirling engine. A Stirling engine is an external combustion engine, i.e. an engine which uses a heat carrying medium to convert heat from a low pressure combustion process into mechanical (rotational) energy. A heat exchanger of a Stirling engine, including a set of tubes for carrying a working fluid, e.g. hydrogen gas, may therefore extend into a combustion chamber, where residue gas from an industrial plant is supplied and combusted. The combustion in such a Stirling engine is similar to that of a flare stack, i.e. combustion at (or close to) atmospheric pressure. As such, it may safely handle contaminated gas and varying levels of H2.

However, a Stirling engine is a complex and expensive machine. Conventional Stirling engines are much too small to be relevant in the context of an industry process such as a smelting plant. And to design a significantly larger Stirling engine and arbitrary output power according to local prerequisites would be difficult and costly. Also, although generally a very reliable machine, a Stirling engine will inevitably require maintenance at some point which will be less efficient and more costly with many variants of engines.

European (non-published) application EP 18214336.2 discloses a system of several Stirling engines which may be used to recover energy in residue gases. According to the present invention, such a system of Stirling engines is used as a modular flare unit, arranged in parallel with a conventional flare stack. The result is a safe and efficient conversion of residue gas which may be installed quickly (i.e. during a scheduled interruption of production) and without substantial construction. In principle, it is simply a question of briefly interrupting the flow of gas to the flare stack in order to insert a flow valve which may direct a portion of the flow to one or several modular flare units.

By relying on a plurality of smaller energy conversion modules (Stirling engines), the overall reliability is increased. Further, as the energy conversion modules are detachably supported, and may be quickly disconnected from the flow of residue gas with the inlet valve, each module may be individually disconnected, removed from the system e.g. for repair or maintenance. During such repair or maintenance of a module, a replacement module may be connected. This is beneficial, as it does not require permanent presence of operating staff. Service and maintenance of each unit may be performed off-site, avoiding long process interruptions, as well as additional risks and cost of building a workshop in a hazardous environment. This in turn means that the flare unit may be placed on site, also in a hazardous environment, thus avoiding the need for long pipe transportation of residue gas.

In some sites replacement of an individual module will be possible during normal operation, while other sites have strict safety standard preventing people to enter the area of the flare unit except at timed service intervals.

An industry site may install an adequate number of identical flare units, connected in parallel or in series according to local gas flow prerequisites resulting in a highly flexible and cost optimized design. Each flare unit may have a preset number of energy conversion modules and thus a preset power. As an (non-limiting) example, a flare unit may comprise 14 modules and have a total output power of around 400 kW.

An adequate number of flare units, each with a given capacity (e.g. in the order of 100 kW, such as 400 kW mentioned above) can then be combined to design a flare system 10 with appropriate capacity. Due to the modular design economies of scale will drive down the unit cost. The decreased unit cost will have a significant impact on return on investment also for applications requiring relatively few flare units. Also, the delivery, installation, maintenance and support will be more or less identical regardless of the number of units, again leading to an improved business case also for relatively low levels of energy content. It is noted that conventional systems for energy recovery in residue gas are typically large scale and have significant threshold investments, and are therefore difficult to get profitable (or even to reach break-even) for relatively small energy content (e.g. less than 10 MW). The modular approach of the present invention provides an economically viable alternative also for these cases.

When the energy content in the flow of residue gas is fluctuating, a reasonable approach may be to install a number of flare units such that the final (marginal) unit reaches a utilization ratio sufficient to motivate its investment. As an example, this threshold may for an example be at least 80% from an investment point of view alone besides environmental considerations. During periods when the output of residue gas is greater than the total number of installed flare units can absorb, the surplus may be flared in the flare stack.

In addition, a modular flare unit comprising several Stirling engines (modules) may further be dynamically controlled to handle quickly varying flows of gas. In principle, one or several individual Stirling engines may be shut down instantaneously and without warning using the inlet valve. In one unit, comprising several Stirling engines, the capacity to absorb a gas flow will therefore be significant. A high degree of energy conversion from the fluctuating flow of residue gas may thus be achieved.

A modular flare unit according to the invention may be used as the only power conversion system, but may alternatively be used in combination with a large scale power station like a turbine to extend the power conversion rate. However, it is important to note that an energy conversion system according to the invention is principally more similar to a flare process than to a turbine station. Not only does the combustion take place a low (atmospheric) pressure, but the capacity is also dynamically adjustable on short time frame under very safe conditions, similar to a flare and on long term by providing a flexible build system to according to local prerequisites in terms of gas flow as discussed above.

Further, compared to a turbine station, or other large-scale power stations, a "standard built" modular flare unit according to the present invention is inexpensive, and may be motivated by a relatively small supply of residue gas. Consequently, it may be used to convert energy from the fluctuating flow of gas too small to power a turbine or equivalent power system.

The flare stack may be an elevated flare (e.g. as shown in FIG. 1) or a ground flare (i.e. flaring closer to ground). An elevated stack has the advantage of emissions and radiation being located at a distance from personnel on the ground. A ground flare may on the other hand be less expensive to put in place. In order to prevent access to the flare, and also to reduce radiation and sound/light pollution in its vicinity, a ground flare may be enclosed by suitable walls.

It is noted that the inventive concept is in fact not necessarily limited to include a flare stack at all. For example, in a situation where an industrial site is already equipped with a flare stack, a flare system according to the present invention may only include the flare unit(s), and still provide the above mentioned advantages.

In one embodiment, each energy conversion module comprises an individual electrical generator. This further facilitates disconnection of one energy conversion module, as there all mechanical connections between the Stirling engine and the generator are contained in the module.

Each energy conversion module is preferably a "standard" (one-size) module, i.e. all modules are manufactured to be identical in design and function. Such standardized modules will reduce manufacturing costs (economy of scale) and also reduce cost for installation, maintenance, spare parts, training, etc. Preferably, also each flare unit is standardized, to even further increase the economies of scale.

The flare unit may be pre-built in a standardized intermodal container, thereby facilitating transport and installation.

BRIEF DESCRIPTION OF THE DRAWINGS

The present invention will be described in more detail with reference to the appended drawings, showing currently preferred embodiments of the invention.

FIG. 5b shows one working fluid circuit of the Stirling engine in FIG. 5a.

DETAILED DESCRIPTION OF PREFERRED EMBODIMENTS

Figure 1:
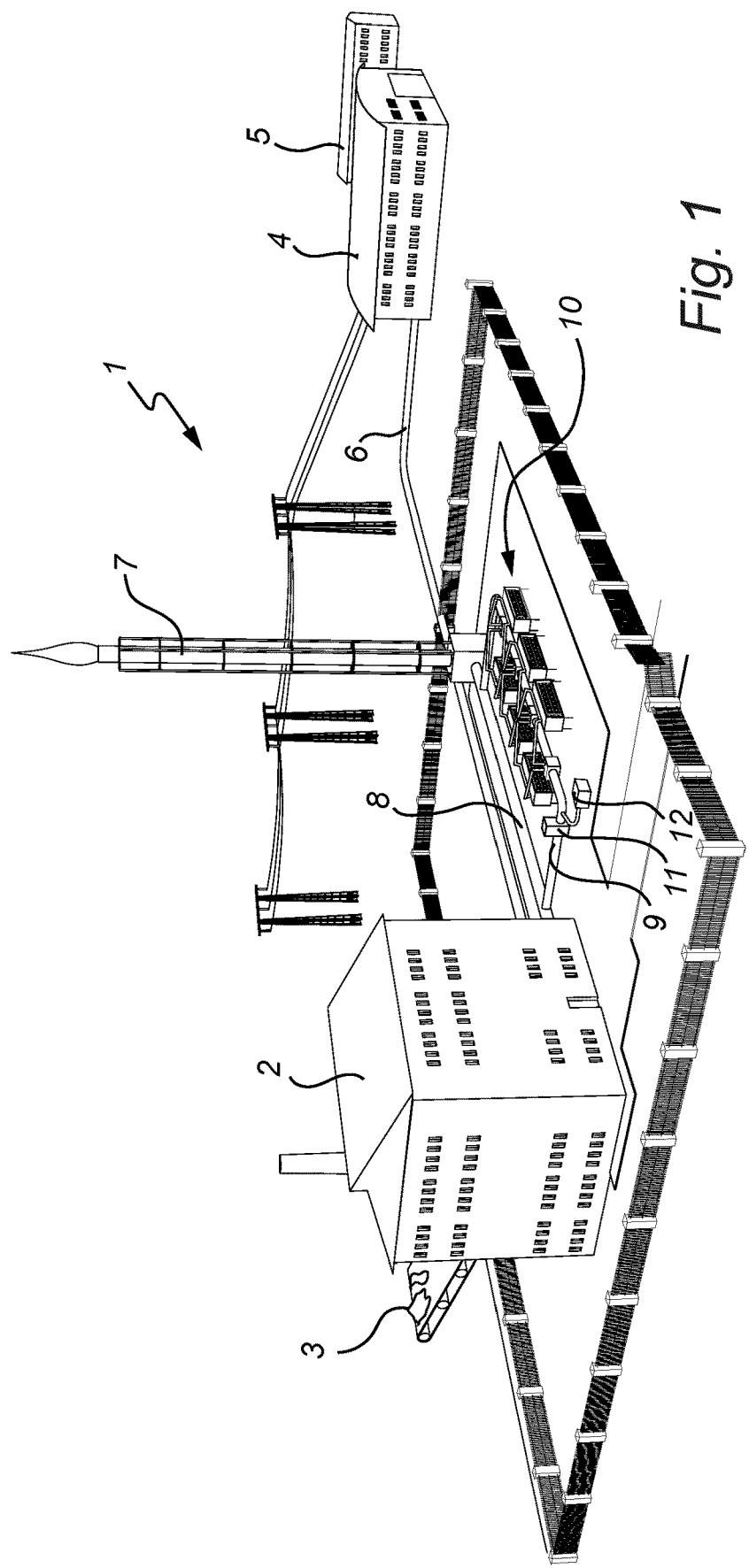
FIG. 1 shows a schematic view of an industrial site such as a smelting plant, including several modular flare units according to the present invention.

Embodiments of the present invention will now be described with reference to an industrial site 1 where a smelting plant 2 is operated. The smelting plant receives metal ore 3, and outputs different types of metal. As a bi-product of this process is a flow of residue gas, including a mix of gaseous compounds, including H2, CO, and also various particles. As it may contain toxic gases (such as CO), this gas must be handled carefully, and not be emitted into the ambient surroundings.

As an example, the flare system according to the invention may be useful for residue gasses containing CO, $H_2$ and various $C_xH_y$ gases. Residue gas of this kind are typically formed during production of Ferro-alloys. In addition to residue gas from ferro-alloy production, the flare system disclosed herein could be useful also for Combined Oxygen Gas (COG), Blast Furnace Gas (BFG) and Basic Oxygen Furnace Gas (BOFG).

Table 1 below (published in the article "Burners in the steel industry: utilization of by-product combustion gases in reheating furnaces and annealing lines", by Sebastian Caillat, Energy Procedia, Volume 120, August 2017, Pages 20-27) provides typical gas compositions for three different metal industry processes, Combined Oxygen Gas (COG), Blast Furnace Gas (BFG) and Basic Oxygen Furnace Gas (BOFG).

TABLE 1

Typical gas composition and characteristics in steel mills [2], [5], [6], [8].

| Element/Parameter | Unit | COG | BFG | BOFG |
|---|---|---|---|---|
| $H_2$ | % vol. | 36.1-61.7 | 1-8 | 2-10 |
| CO | % vol. | 3.4-5.8 | 19-27 | 55-80 |
| $CH_4$ | % vol. | 15.7-27 | — | — |
| $C_xH_y$ | % vol. | 1.4-2.4 | — | — |
| $CO_2$ | % vol. | 1-5.4 | 16-26 | 10-18 |
| $N_2$ + Ar | % vol. | 1.5-6 | 44-58 | 8-26 |
| Low Heating Value | $MJ/Nm^3$ | 9-19 | 2.6-4.0 | 7.1-10.1 |
| Density | $kg/Nm^3$ | 0.45-0.65 | ~1.3 | 1.32-1.38 |
| Specific air demand | $Nm^3/Nm^3$ | 4.2-4.9 | 0.5-0.8 | 1.34-1.90 |
| Adiabatic flame temperature | °C. | ~2000 | ~1400 | ~2000 |

Some residual gasses (e.g. COG) may be reused to a high extent within the industrial process (e.g. smelting). Also BOFG and BFG is reused (drying) within the metal industry process, but there is significant a surplus that typically is burned in a flare stack. The site 1 in FIG. 1 therefore includes a flare stack 7, where the residue gas may be burned, thereby effectively getting rid of toxic gases like CO. The stack is provided with reside gas through pipe 8, channeling all gas which is not reused in the plant or otherwise recovered.

As discussed above, there are several reasons to flare the surplus gas, including:

Security

Relatively small quantities not profitable to distribute or feed a turbine or other large scale power plant Fluctuating flow, requiring a dynamic combustion process High—and fluctuating-hydrogen content and impurities that prevent usage of internal combustion engines for power production Returning to the example in FIG. 1, there is a relatively large flow of residue gas with fluctuating energy content, as illustrated in FIG. 2.

In order to avoid flaring the rather large amounts of energy in the residue gas, an additional flare system 10 is connected in parallel with the flare stack 7, to a branch 9 of pipe 8.

The additional flare system 10 is modular, and includes several standard built units 30 optimized to local gas supply (see FIG. 3), each unit including a several, preferably more than 10, energy conversion modules 40 with a Stirling engine (see FIG. 4). The number of modules 40 in each unit 30 may vary depending on design choice, but typically two rows of modules (an upper and a lower row) is suitable, leading to an even number of modules. A gas conditioning unit 11 is arranged along the pipe 9, and is configured to pre-condition the residue gas. The pre-conditioning may involve pre-heating the residue gas to a temperature suitable for combustion in the flare system 10. Further, the pre-conditioning unit 11 may include a filter, e.g. a "scrubber", to remove particles present in the residue gas. As an example, residue gas from the smelting plant may contain 50 mg/Nm$^3$, which is preferably reduced to around 2.5 mg/Nm$^3$ by the scrubber. It may also be appropriate to dehumidify the residue gas, i.e. remove water vapor present in the gas. As an example, the humidity may be brought down to 80% or less, Finally, the conditioning unit may pressurize the gas to an extent that it is forced to the flare system 10. Alternatively, the flare system 10 may comprise one or several fans to create an under-pressure sucking the residue to the flare system 10.

Figure 3:
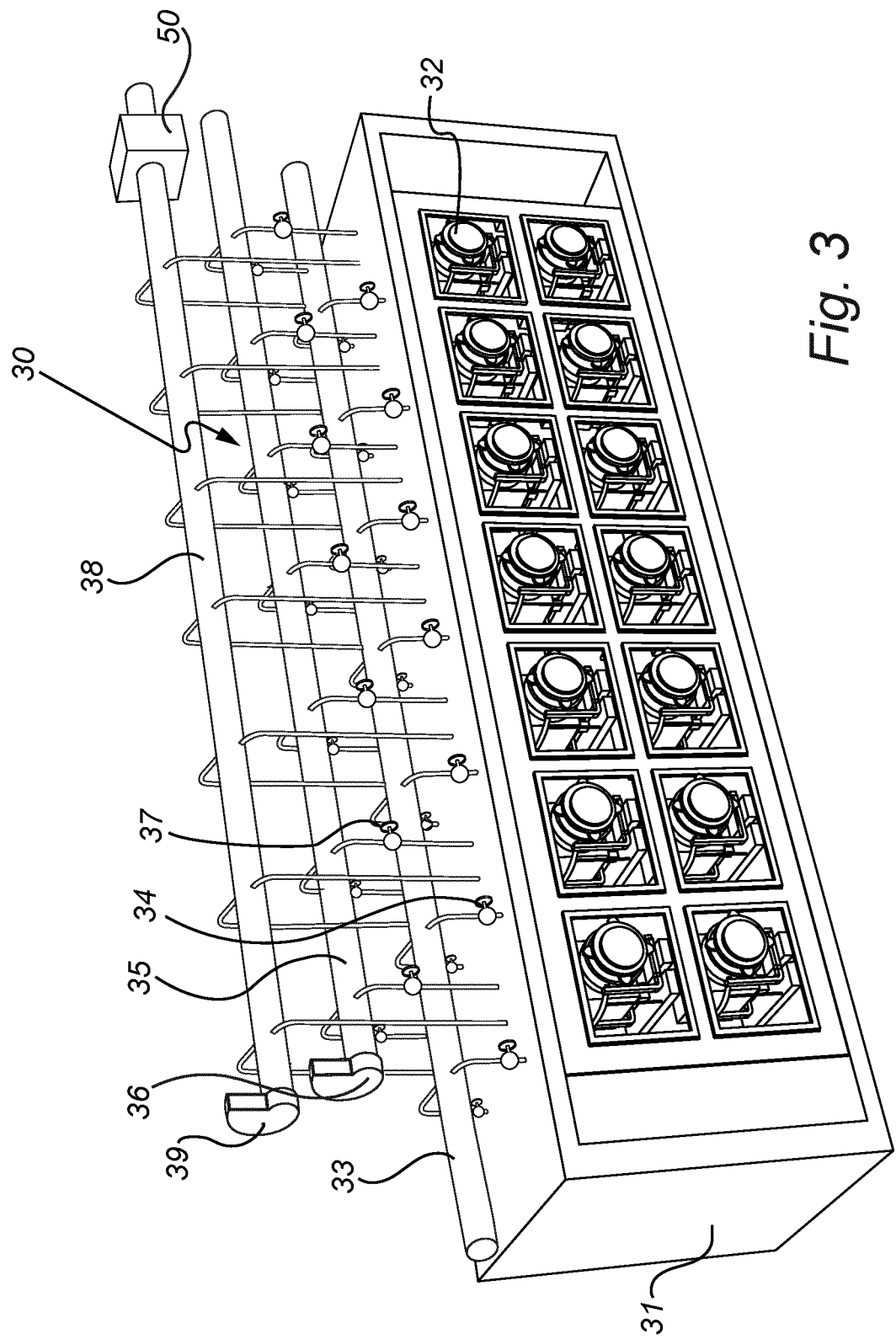
FIG. 3 shows in greater detail one of the modular flare units in FIG. 1 according to an embodiment of the invention.

FIG. 3 shows one of the units 30 in more detail. In the illustrated case each unit 11 includes fourteen energy conversion modules 40, each being releasably arranged in a frame 31, e.g. formed by a standard size intermodal cargo container. In the illustrated case, the frame 31 has a pre-defined number of bays 32, each which is configured to receive an energy conversion module 40. The bay is provided with a suitable mechanical fixation device, for securing the module 40 in the bay 32. Although not illustrated in FIG. 3, each bay 32 may also be closed by a lid or hatch, to prevent access to the modules 40.

Figure 4A:
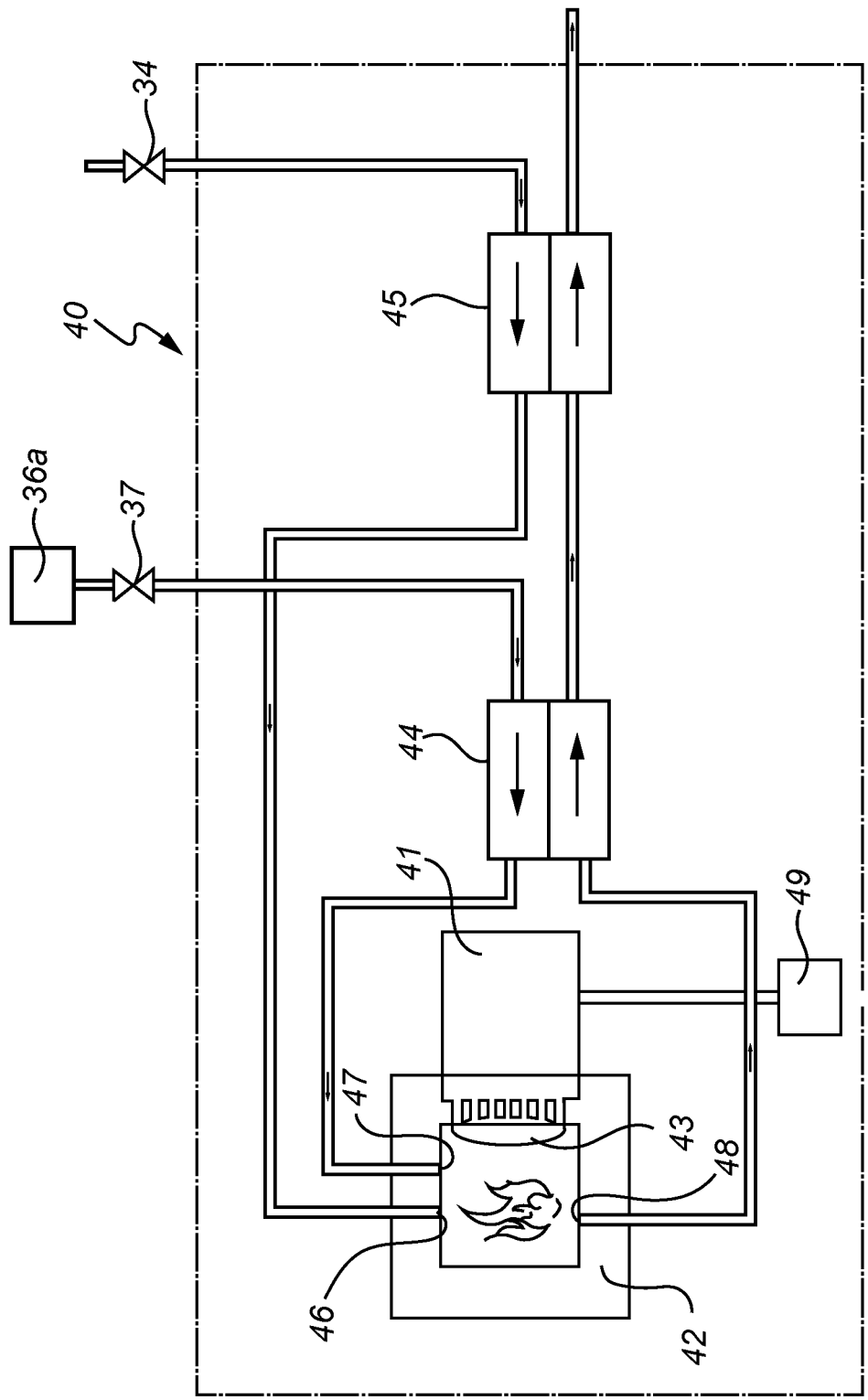
FIG. 4a is a schematic block diagram of one of the energy conversion modules in FIG. 3.
Figure 4B:
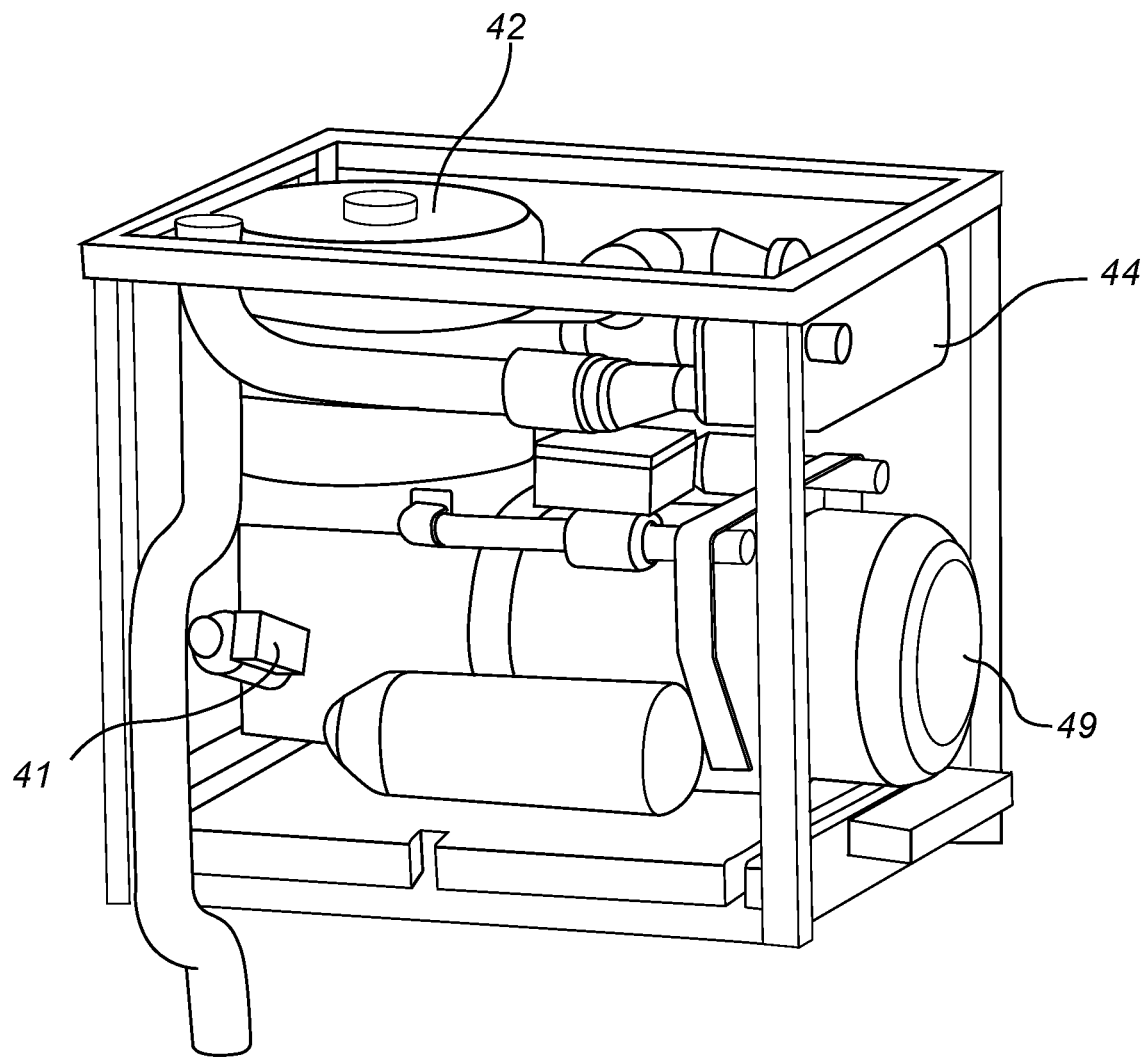
FIG. 4b is a schematic perspective view of one of the energy conversion modules in FIG. 3.

Each energy conversion module 40 includes a Stirling engine 41 and one combustion chamber 42, as will be shown more clearly in FIGS. 4a and 4b. As an example, each Stirling engine may have an output power of 30 kW, in which case the unit 30 (which here has 14 modules) has an output power of around 400 kW. In FIG. 1 there are six flare units 30, thus a total energy converting output power of around 2.4 MW.

Figure 2A:
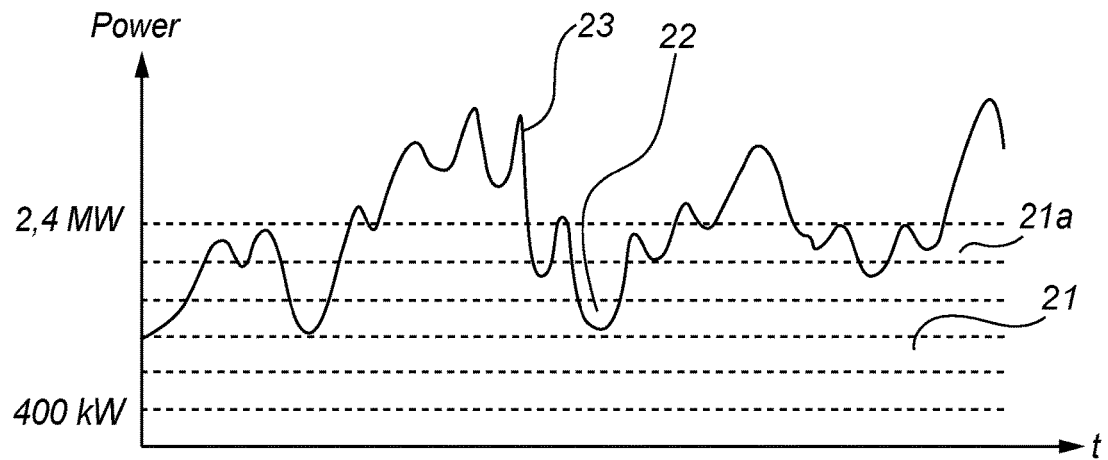
FIGS. 2a and 2b are diagrams showing examples of fluctuating energy content in the flow of residue gas from the smelting plant in FIG. 1.

This is indicated in FIG. 2a as six 400 kW "slices" 21. The modular flare system 10 has been adapted to the expected average flow of residual gas from this particular plant. As is clear from FIG. 2, the first three flare units (the lower three slices 21) will operate 24/7, as the energy content always exceeds 1.2 MW. The next two units will operate almost always, only briefly interrupted during periods 22 when the energy content of the residue gas is lower than average. And the final unit (uppermost slice 21a) will operate at least 80% of the time (i.e. 80% utilization ratio), providing a maximum energy conversion capacity of 2.4 MW. The threshold for when an additional flare unit should be added to the system, i.e. at what expected utilization ratio, will be determined by factors such as: local energy prices, available output power from the electrical grid, energy content of the residue gas, maintenance scheduling, efficiency of the Stirling engine (due to e.g. height above sea level), requirements on local environment, Capex and cost of capital, etc. During periods 23 when the flow exceeds this level, the conventional flare stack will be used to burn the excess residue gas. During periods 22 when the flow is low, a specific unit could be shut down for maintenance and/or replacing of flare modules.

Figure 2B:
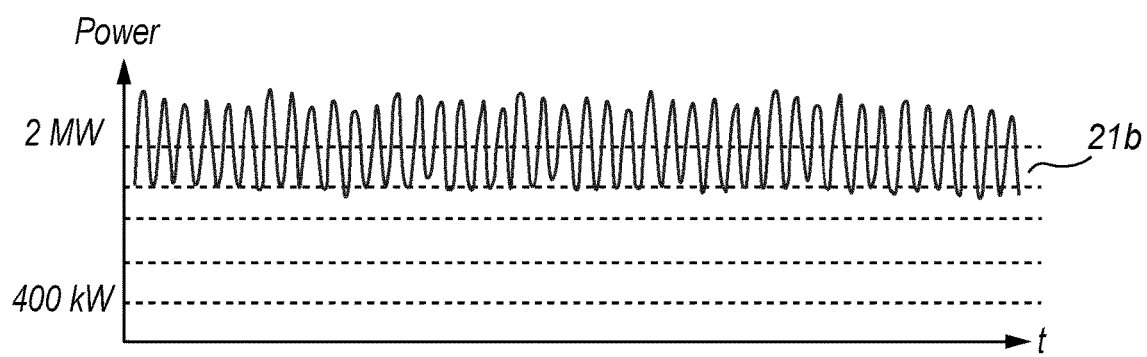

It is noted that it may be beneficial to also include an intermediate gas storage 12 connected to the pipe 9, in order to allow for storage of surplus residue gas during periods when the gas energy content exceeds the capacity of the flare system 10. Such intermediate storage of gas may be an important factor when planning the energy conversion system. The intermediate storage 12 could be present within the industrial facility (as shown in FIG. 1) or could be built together with the flare system according to the local prerequisites. Intermediate storage may be specifically useful for quickly varying energy content, as illustrated in FIG. 2b. Here, the gas flow has periodic energy peaks corresponding to the capacity of two flare units. Under such circumstances, it may not be possible to economically motivate an additional flare unit. However, by introducing an intermediate gas storage 12, it may be possible to operate an additional flare unit almost continuously (slice 21b in FIG. 2b). Quickly variating gas flow requires smaller intermediate storage capacity compared to slow variations.

The unit 30 is connected to the pipe 9 (see FIG. 1) and includes a manifold 33 which connects the flow of residue gas to each combustion chamber 42, where it can be com busted at near atmospheric pressure. Typically, the pressure in the combustion chamber 42 is slightly greater than atmospheric pressure, e.g. 0-500 mbar greater, preferably 50-100 mbar greater. Each branch of the manifold 33 is provided with an ON/OFF valve 34, to enable disconnection of each module 40 from the flow of residue gas.

A second manifold 35 is connected to provide air from the ambient to the modules 40. A fan 36 forces ambient air into the manifold 35. Each branch of this manifold 35 is also provided with some means to interrupt the flow, for example a valve 37. Alternatively, each module 40 may be provided with an individual fan for incoming air, in which case the flow of incoming air may be interrupted by turning off the fan.

A third manifold 38 is connected to receive exhaust from the modules A fan 39 is arranged to force the exhaust through the manifold 38. Optionally a filtering unit 50 may be arranged at the end of the exhaust manifold 38 to provide additional particle filtering and/or $CO_2$ capture of the exhaust gases. This may be especially advantageous if additional recovery of heat energy from the exhaust gases is intended. It is noted that the exhaust gases (even after cooling in the heat exchangers 44 and 45, see below) may contain significant amounts of heat energy, which may be recovered.

Although all three manifolds 33, 35 and 38 are illustrated as arranged external to the frame 31, one or several of the manifolds may alternatively be arranged inside the frame. For example, the fuel and air manifolds 33, 35 may be arranged inside the frame 31, while the exhaust manifold 38 is arranged outside the frame 31.

With reference to FIGS. 4a and 4b, the module 40 includes a Stirling engine 41, a low pressure combustion chamber 42, and a heat engine heat exchanger 43 extending into the chamber 42. The module further comprises an air heat exchanger 44 connected to the air supply valve 36. A fuel inlet 46 of the combustion chamber is connected to receive residual gas, while an air inlet 47 is connected to receive air from the air heat exchanger 44. An exhaust outlet 48 of the combustion chamber is connected to the air heat exchanger 44, where it pre-heats the incoming air. The residual gas may be conditioned and preheated in the conditioning unit 11. However, each module may also include a fuel heat exchanger 45 configured to heat the incoming fuel (residual gas) using the exhausts. As shown in FIG. 4b, it may be connected downstream the air heat exchanger. As a result of the heat exchanger(s), the temperature of the combusted exhaust gases can be significantly reduced, and the energy conversion can be made even more efficient.

It is noted that the air heat exchanger 44 and fuel heat exchanger 45 alternatively be shared by several (or all) energy conversion modules 40 in the unit 30. Each module 40 should, however, be provided with separate valves 34 and 36 in order to allow disconnection of the module 40.

Also shown in FIG. 4b is an air filter 36a arranged before the valve 35 to remove particles from the incoming air. This filter 36a may be integrated in the fan 36, or may be individual for each module 40.

The Stirling engine 41 is further connected to an output shaft (not shown in FIGS. 4a and 4b), and the module 40 is thus configured to convert chemical energy in the residue gas to mechanical (rotational) energy. The output shaft is in turn connected to an electrical generator 49 for generation of electrical energy. The generator may be connected to a local energy storage, to the local industry power grid, or be connected to supply power to the mains power grid.

In the illustrated example, each module 40 includes a separate generator 49. However, it is also possible that two or more modules 40 are connected to a common generator. Indeed, all modules 40 of a flare unit 30 may share one single generator.

Figure 5A:
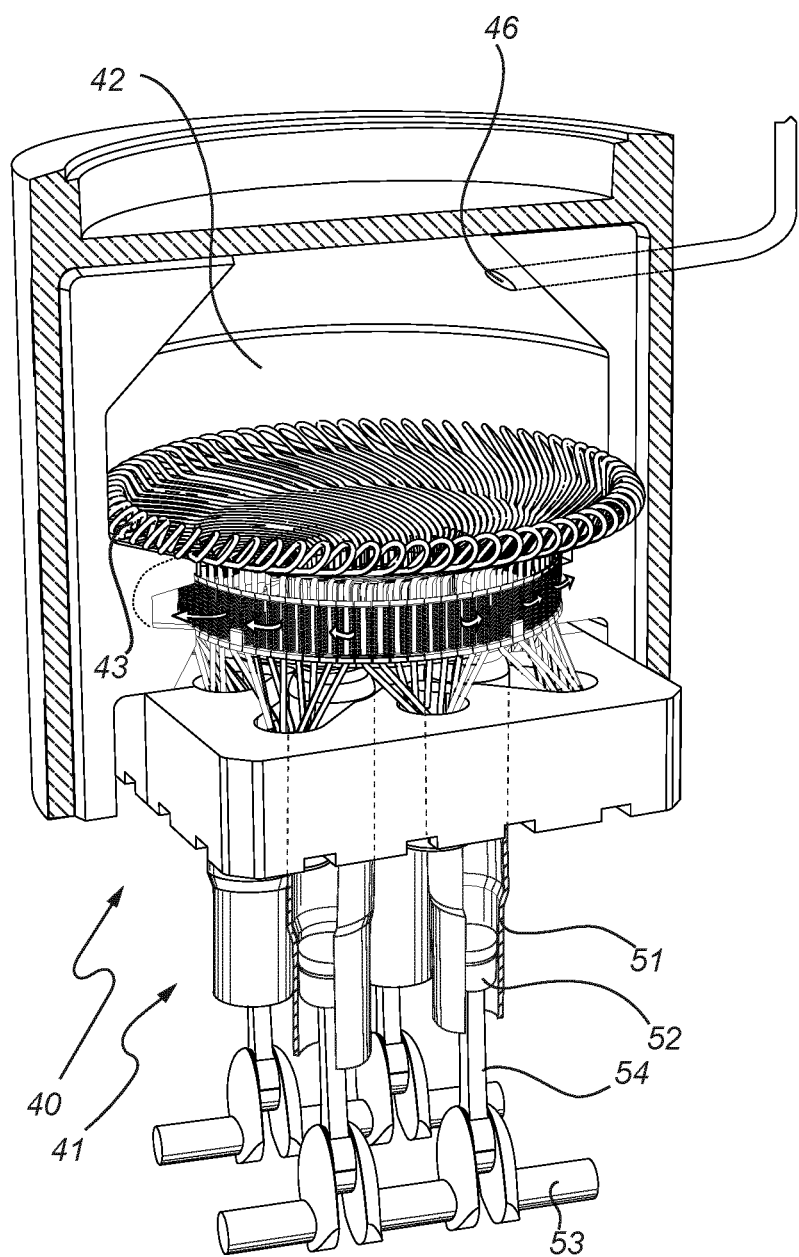
FIG. 5a shows a perspective view of some parts an exemplary energy conversion module as shown in FIG. 4b.

FIG. 5a shows some of the elements of the energy conversion module 40 in more detail. In the upper part of the figure is the combustion chamber 42 with the fuel inlet 46, and the heat engine heat exchanger 43 extending into the chamber 42. In the lower part of the figure is the Stirling engine 41 having one or several cylinders 51 each having a piston 52 connected to an output shaft 53 by means of a rod 54.

The components and working principles of the Stirling engine are known in the art, and will not be described in detail here. However, in brief, a Stirling engine moves a working fluid (e.g. hydrogen gas) back and forth between a cold side and a warm side of a cylinder. On the warm side, the working fluid expands, thus operating the piston in the cylinder. On its path between the cold side and the warm side, the working fluid is heated. During operation of the Stirling engine, the working fluid pressure thus alternates between a high pressure (during the compression stage) and a low pressure (during the expansion stage). As an example, the pressure ratio may be 1 to 1.6.

In the present example, the heating of working fluid is accomplished by the heat engine heat exchanger 43, which comprises a set of tubes 43a extending into the combustion chamber. As fuel is burned in the combustion chamber, the working fluid in the heat exchanger is heated before reaching the warm side of the cylinder.

Figure 5B:
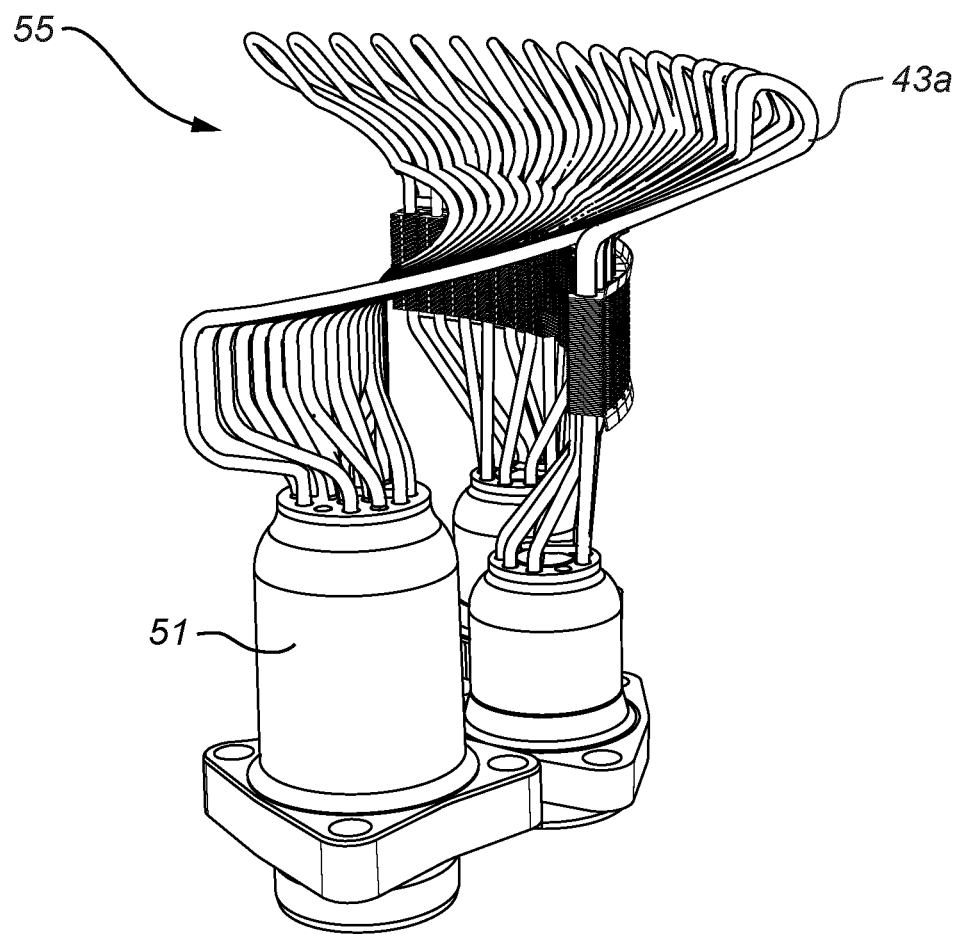

The illustrated Stirling engine 41 comprises four cylinders 51, each associated with one section of the heat exchanger 43, as shown in FIG. 5b. In principle, each cylinder 51 and associated part of the heat exchanger 43 form a separate working fluid circuit 55. Typically, however, these fluid circuits are connected, such that each four-cylinder Stirling engine has only one single working fluid circuit 55.

In order to disconnect and remove an energy conversion module 40 form the unit 30, the valves 34 and 37 are closed, and the module is disconnected from all three manifolds 33, 35 and 38. Further, the generator 49 is disconnected from the power system to which it delivers electrical power. After that, the module 40 may be removed from the frame 31.

In principle, such disconnection and removal of a module 40 may be performed while other Stirling engines in the unit 30 are still operating. For security reasons, however, the disconnection and removal of a module is typically performed during a (short) interruption of the industrial process. As mentioned above, the unit 30 may then be operated with one less module 40, or alternatively the module 40 is replaced by another module 40 before operation is resumed.

The person skilled in the art realizes that the present invention by no means is limited to the preferred embodiments described above. On the contrary, many modifications and variations are possible within the scope of the appended claims. For example, the number of cylinders in each Stirling engine may be other than four. Also, the number of energy conversion modules in each unit (container) may be smaller than or greater than 14 (although it is preferably an even number for symmetry reasons). Most likely a unit (container) contains at least ten modules.

The invention claimed is:

1. A flare system for recovery of energy in a flow of residual gas generated in an industrial process, the system including:
    a flare stack, connected to the flow of residue gas and arranged to perform open combustion of said residue gas, and
    at least one modular flare unit connected to said flow of residue gas in parallel with the flare stack, said modular flare unit being arranged to recover energy in said residue gas, each modular flare unit including:
        a frame;
        at least two energy conversion modules detachably supported by the frame;
        a fuel manifold connected to receive the flow of residue gas;
        an air manifold connected to receive air from the ambient;
        an exhaust manifold connected to receive exhaust from the energy conversion modules; and
        an electric generator,
        each energy conversion module including:
            a combustion chamber having a fuel inlet selectively connectable to said fuel manifold via a fuel valve, an air inlet selectively connectable to said air manifold via an air valve, and an exhaust outlet connected to said exhaust manifold, said combustion chamber configured to receive a flow of residue gas through the fuel inlet for combustion in the chamber at close to atmospheric pressure, and
            a Stirling engine configured to convert heat from the combustion chamber into mechanical energy, said Stirling engine having a heat engine heat exchanger including a set of tubes conducting a compressible working fluid, a portion of said heat engine heat exchanger extending into the combustion chamber, and one or several cylinders each having a piston connected to an output shaft, wherein said electric generator is connected to the output shaft and is configured to generate electric power from said mechanical energy.

2. The flare system according to claim 1, wherein the flare stack is an elevated flare stack or a ground flare stack.

3. The flare system according to claim 1, wherein each energy conversion module comprises one electrical generator.

4. The flare system according to claim 1, wherein each energy conversion module further comprises an air heat exchanger configured to pre-heat incoming air using exhausts from said exhaust outlet and/or a fuel heat exchanger configured to pre-heat incoming fuel using exhausts from said exhaust outlet.

5. The flare system according to claim 1, further comprising a gas conditioning unit arranged upstream the modular flare unit.

6. The flare system according to claim 1, further comprising a gas storage unit arranged upstream the modular flare unit.

7. The flare system according to claim 1, wherein the modular flare unit further comprises at least one air filter, connected to remove particles from air supplied to each air inlet.

8. The flare system according to claim 1, wherein each Stirling engine E has a plurality, preferably four, cylinders.

9. The flare system according to claim 1, wherein each Stirling engine has equal power capacity.

10. The flare system according to claim 1, wherein each energy conversion module has substantially equal physical and functional design.

11. The flare system according to claim 1, further comprising an air fan arranged to force ambient air into the air manifold.

12. The flare system according to claim 1, further comprising an exhaust fan arranged to force exhausts out from said exhaust manifold.

13. The flare system according to claim 1, further comprising a $CO_2$ capturing unit arranged on said exhaust manifold.

14. The flare system according to claim 1, wherein the modular flare unit is housed in an intermodal container.

15. The flare system according to claim 1, wherein a pressure in each combustion chamber is 0-500 mbar greater than atmospheric pressure.

16. The flare system according to claim 1, wherein a pressure in each combustion chamber is 50-100 mbar greater than atmospheric pressure.

* * * * *